(12) United States Patent
Cogiel et al.

(10) Patent No.: US 8,560,215 B2
(45) Date of Patent: Oct. 15, 2013

(54) PROCESS AND SYSTEM FOR DETERMINING FUEL CONSUMPTION OF A MOTOR VEHICLE

(75) Inventors: Janus Cogiel, Munich (DE); Herbert Jilg, Munich (DE); Wolfgang Rieger, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 361 days.

(21) Appl. No.: 13/087,630

(22) Filed: Apr. 15, 2011

(65) Prior Publication Data

US 2011/0257875 A1    Oct. 20, 2011

(30) Foreign Application Priority Data

Apr. 16, 2010   (DE) .......................... 10 2010 027 862

(51) Int. Cl.
   *G06F 19/00*   (2011.01)
(52) U.S. Cl.
   USPC ....... 701/123; 701/22; 73/114.52; 73/114.53; 123/332; 123/333; 340/439
(58) Field of Classification Search
   USPC ................... 701/22, 123; 73/114.53, 114.52, 73/114.54; 340/439; 123/332–333; 324/428; 235/61 J
   See application file for complete search history.

(56) References Cited

U.S. PATENT DOCUMENTS

| | | | | |
|---|---|---|---|---|
| 2,649,709 | A | * | 8/1953 | Sturtz .......................... 73/114.53 |
| 3,722,265 | A | * | 3/1973 | Metz et al. .................. 73/114.14 |
| 3,802,256 | A | * | 4/1974 | Formwalt .................... 73/114.52 |
| 3,975,952 | A | * | 8/1976 | Lacher et al. ............... 73/114.13 |
| 4,186,296 | A | * | 1/1980 | Crump, Jr. ................... 235/61 J |

(Continued)

FOREIGN PATENT DOCUMENTS

| | | |
|---|---|---|
| CN | 1 016 19 994 A | 1/2010 |
| EP | 1 018 449 A2 | 7/2000 |

(Continued)

OTHER PUBLICATIONS

Enhanced plug-in hybrid electric vehicles; Millner, A. et al., Innovative Technologies for an Efficient and Reliable Electricity Supply (CITRES), 2010 IEEE Conference on; Digital Object Identifier: 10.1109/CITRES.2010.5619783; Pub. Year: 2010 , pp. 333-340.*
Fundamental study on effect of preceding vehicle information on fuel consumption reduction of a vehicle group; Matsumoto, Shuichi ; Kawashima, Hironao; Communications and Networks, Journal of ; vol. 15 , Issue: 2; Digital Object Id: 10.1109/JCN.2013.000030; Pub Yr: 2013 , pp. 173-178.*

(Continued)

*Primary Examiner* — Cuong H Nguyen
(74) *Attorney, Agent, or Firm* — Crowell & Moring LLP

(57) ABSTRACT

A process and system are provided for determining fuel consumption of a motor vehicle. A first mean fuel consumption, which cannot be reset under a user's influence, is determined. A second mean fuel consumption, which can be reset under a user's influence, is determined as a function of several measured values. A third mean fuel consumption is determined as follows: (a) at the beginning of a predefined time period, which starts with a resetting of the second mean fuel consumption, the third mean fuel consumption is set to be equal to the first mean fuel consumption; (b) between the beginning and the end of the predefined time period, the third mean fuel consumption is set to be a weighted mean of the first mean fuel consumption and the second mean fuel consumption; and, (c) starting at an end of the predefined time period, the third mean fuel consumption is set to be equal to the second mean fuel consumption. A signal indicative of the third mean fuel consumption is provided.

11 Claims, 3 Drawing Sheets

(56) References Cited

U.S. PATENT DOCUMENTS

| | | | |
|---|---|---|---|
| 4,400,779 A * | 8/1983 | Kosuge et al. | 701/123 |
| 4,845,630 A * | 7/1989 | Stephens | 701/123 |
| 5,693,876 A * | 12/1997 | Ghitea et al. | 73/114.53 |
| 5,995,886 A * | 11/1999 | Tanaka et al. | 701/123 |
| 6,453,731 B1 * | 9/2002 | Yaegashi | 73/114.52 |
| 7,509,193 B2 * | 3/2009 | Kustosch | 701/22 |
| 2011/0257875 A1 * | 10/2011 | Cogiel et al. | 701/123 |

FOREIGN PATENT DOCUMENTS

| | | | |
|---|---|---|---|
| EP | 1018449 A2 * | 7/2000 | |
| JP | 8-230862 * | 8/1996 | |
| JP | 2000205925 A * | 7/2000 | |
| JP | 2010-31760 A | 2/2010 | |
| WO | WO 03/106208 * | 12/2003 | |

OTHER PUBLICATIONS

Two-Layer Energy-Management Architecture for a Fuel Cell HEV Using Road Trip Information; Kelouwani, S. et al.; Vehicular Technology, IEEE Transactions on; vol. 61, Issue: 9; Digital Object Identifier: 10.1109/TVT.2012.2214411 Publication Year: 2012, pp. 3851-3864.*

Influence of the drive cycles on the sizing of hybrid storage system battery-supercapacitor supplying an electric vehicle; Sadoun, R. et al.; IECON 2011—37th Annual Conf. on IEEE Industrial Electronics Society; Digital Object Identifier: 10.1109/IECON.2011.6119984; Pub. Year: 2011, pp. 4106-4112.*

German Search Report dated Aug. 25, 2010 with partial English translation (nine (9) pages).

* cited by examiner

PROCESS AND SYSTEM FOR DETERMINING FUEL CONSUMPTION OF A MOTOR VEHICLE

CROSS-REFERENCE TO RELATED APPLICATIONS

This application claims priority under 35 U.S.C. §119 from German Patent Application No. DE 10 2010 027 862.9, filed Apr. 16, 2010, the entire disclosure of which is herein expressly incorporated by reference.

BACKGROUND AND SUMMARY OF THE INVENTION

The invention relates to a process and a system for determining fuel consumption of a motor vehicle.

As a result of growing awareness of the environment and of increasing fuel prices, low fuel consumption is becoming more and more important to the users of motor vehicles. Systems for determining the fuel consumption in motor vehicles are therefore used to an increasing degree.

It is an object of the invention to create a process and a system for determining fuel consumption of a motor vehicle by which a reliable signaling of the fuel consumption will be permitted.

This and other objects are achieved according to a first and second aspect of the invention, by a process and system for determining fuel consumption of a motor vehicle. A first mean fuel consumption, which cannot be reset under a user's influence, is determined. A second mean fuel consumption, which can be reset under a user's influence, is determined as a function of several measured values. A third mean fuel consumption is determined. At the beginning of a predefined time period, which starts with a resetting of the second mean fuel consumption influenced by the user, this third mean fuel consumption is set to be equal to the first mean fuel consumption; between the beginning and the end of the predefined time period, it is set to be a weighted mean of the first mean fuel consumption and the second mean fuel consumption; and, starting at an end of the predefined time period, it is set to be equal to the second mean fuel consumption. A signal is generated for signaling the third mean fuel consumption.

The above process and corresponding system have the advantage that, also immediately after a resetting of the second mean fuel consumption, a determination of the third mean fuel consumption and a generating of the signal for signaling the third mean fuel consumption become possible, with particularly low fluctuations of the values of the signal. While the determined third mean fuel consumption at the beginning of the predefined time period is determined by the first mean fuel consumption, at the end of the predetermined time period, it will more and more approach the second mean fuel consumption.

In an advantageous further development, the third mean fuel consumption is determined as the sum of the product of the second mean fuel consumption and of a weighting factor and the product of the first mean fuel consumption and the difference of one and the weighting factor. At the beginning of the predefined time period, the weighting factor is set to a zero value. Within the predefined time period, the weighting factor is determined in a linearly increasing manner as a function of a time period expired since the resetting of the second mean fuel consumption. As of the end of the predefined time period, the weighting factor is set to the value of one. This has the advantage that a simple linear development of the time sequence of the weighting factor becomes possible from the zero value at the beginning of the predefined time period to the value of one as of the end of the predefined time period.

In a further advantageous development, it is checked whether the motor vehicle is stopped and, while the motor vehicle is recognized to be stopped, the time period is kept constant that has expired since the resetting of the second mean fuel consumption. This has the advantage that the time period that has expired since the resetting of the second mean fuel consumption remains unchanged when the vehicle is stopped and can continue to run again when the vehicle is restarted. The predefined time period for the signaling of the third mean fuel consumption can thereby be utilized in a maximal fashion.

In a further advantageous development, the motor vehicle is recognized to be stopped when the speed of the motor vehicle falls below a predefined speed threshold value. This has the advantage that, particularly at low vehicle speeds, the time period since the resetting of the second mean fuel consumption remains unchanged, and thereby an influence of values of the second mean fuel consumption that fluctuate particularly severely at low vehicle speeds can be avoided. The predefined time period for the signaling of the third mean fuel consumption can therefore be maximally utilized.

In a further advantageous development, the predefined threshold value of the speed is approximately equal to 15 km/h. As a result, a starting or a stopping of the vehicle, as well as stop-and-go traffic, can be taken into account during the stopping of the time period expired since the resetting of the second mean fuel consumption.

In a further advantageous development, an actual fuel consumption is determined as a function of several measured values. It is checked whether the actual fuel consumption is greater than the third mean fuel consumption and, while this is the case, the time period is kept constant that has expired since the resetting of the second mean fuel consumption. This has the advantage that the time period since the resetting of the second mean fuel consumption remains unchanged when the third mean fuel consumption falls below the determined actual fuel consumption, and thus a faulty calculation of the third mean fuel consumption can be avoided. Furthermore, the time period for the adaptation of the signaling of the third mean fuel consumption can be utilized as well as possible.

According to a third aspect, the invention is characterized by a system which includes a device for determining the fuel consumption of the motor vehicle and a signaling unit. The signaling unit is constructed for receiving the signal for signaling the third mean fuel consumption and for signaling.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of the same construction or function have the same reference symbols including in the figures.

Figure 1:
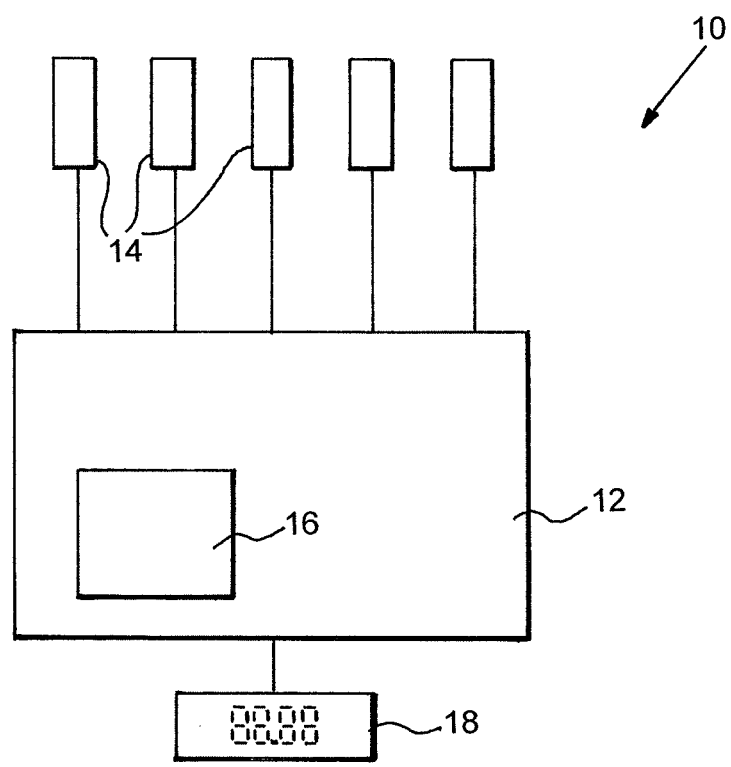
FIG. 1 is a schematic block diagram of a system for determining fuel consumption of a motor vehicle.

FIG. 1 illustrates a system having a device 10 for determining fuel consumption of a motor vehicle. The device 10 for determining the fuel consumption includes a device 12 for determining and storing several mean fuel consumptions. The device 12 for determining and storing the mean fuel consumptions is coupled with sensors 14, by which various measured values can be determined. The device 12 for determining and storing the various mean fuel consumptions has a memory 16 in which the values particularly of a first mean fuel consumption FC_MEAN_LONG, of a second mean fuel consumption FC_MEAN_ACT and of a third mean fuel consumption FC_MEAN can be stored. The meaning of the mean fuel consumptions FC_MEAN_LONG, FC_MEAN_ACT, FC_MEAN will be explained in detail in the following. The device 12 for determining and storing the mean fuel consumptions is further coupled with a signaling unit 18. By way of the signaling unit 18, the different mean fuel consumptions can be signaled to the vehicle user. The signaling can take place especially in a visual or acoustic manner.

Figure 2:
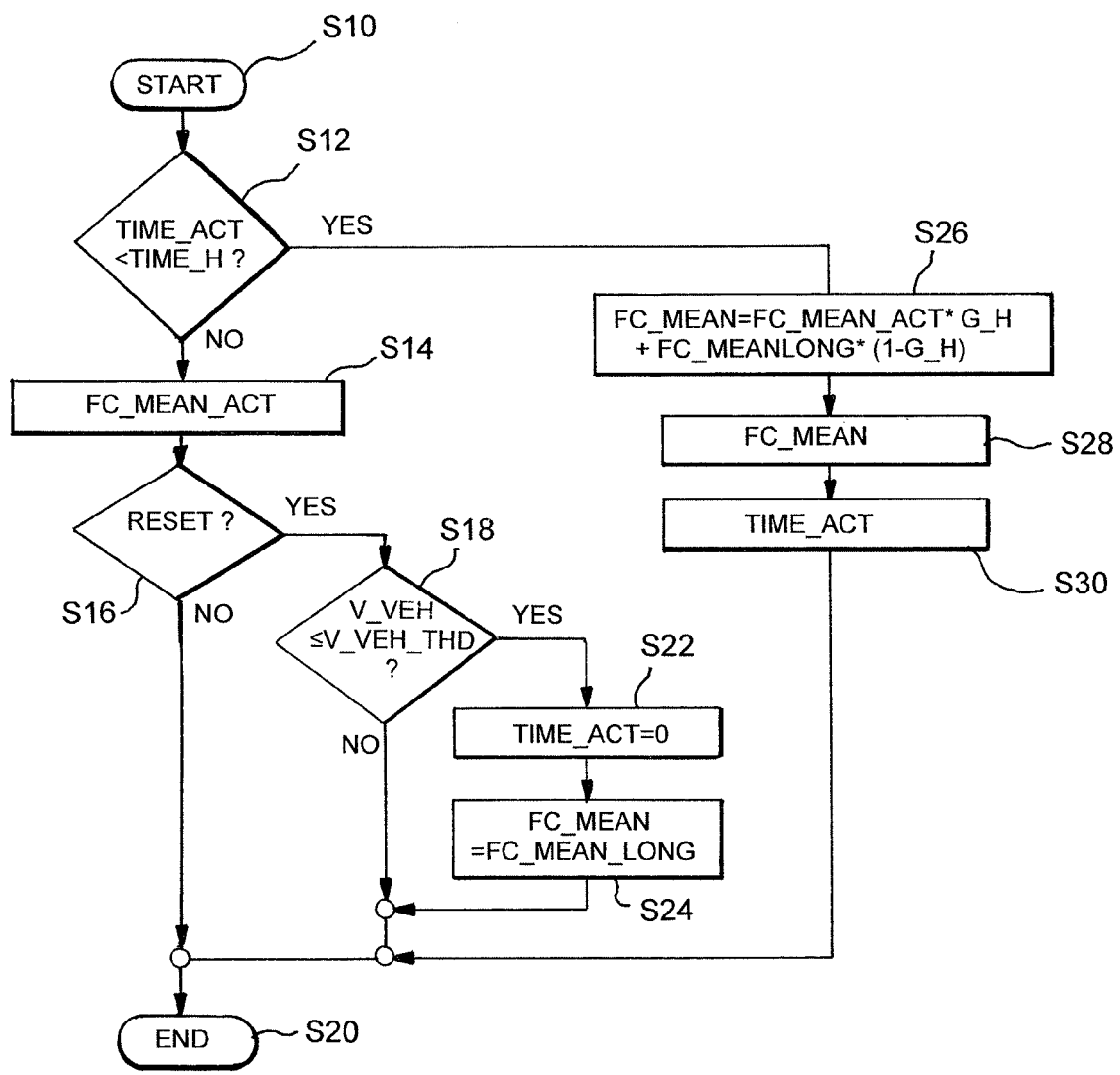
FIG. 2 is a flow chart of a program for determining the fuel consumption of the motor vehicle.

A program for determining fuel consumption of a motor vehicle schematically, illustrated by way of a flow chart in FIG. 2, is preferably stored on a storage medium in the device 10 for determining the fuel consumption. In particular, this program is used for determining the third mean fuel consumption FC_MEAN.

The program is preferably started in Step S10, in which, as required, variables are initialized. This preferably takes place at the beginning of the process for determining the fuel consumption of a motor vehicle.

In Step S12, it is checked whether an elapsed time period TIME-ACT since a resetting of the second mean fuel consumption FC_MEAN_ACT, which second mean fuel consumption value is stored in the memory 16, is shorter than a predefined time period TIME_H. In particular, the predetermined time period TIME_H may be called a harmonization time period. If the condition of Step S12 has not been met, in a Step 14, the second mean fuel consumption FC_MEAN_ACT, which is determined continuously as a function of several measured values, is signaled by means of the signaling unit 18.

In a further Step S16, it is checked whether a resetting RESET of the second mean fuel consumption FC_MEAN_ACT stored in the memory 16 has taken place. If that is so, it is checked in a further Step 18 whether the motor vehicle is stopped, i.e. whether a speed V_VEH of the motor vehicle falls below a predetermined speed threshold value V_VEH_THD. If the condition of Step S16 or of Step S18 has not been met, the program will end in a further Step S20.

In contrast, if the condition of Step S18 has been met, in a further Step S22, the elapsed time period TIME_ACT since the resetting of the mean fuel consumption stored in the memory 16 is set to equal zero. This corresponds to a start of the sequence of the elapsed time period TIME_ACT since the resetting of the second mean fuel consumption FC_MEAN_ACT. In a further Step S24, the third mean fuel consumption FC_MEAN is set to equal the first mean fuel consumption FC_MEAN_LONG which is stored in the memory 16. The first mean fuel consumption FC_MEAN_LONG cannot be reset under the influence of the user of the motor vehicle. The first mean fuel consumption FC_MEAN_LONG may preferably be the mean fuel consumption by which a range of the vehicle is determined as a function of the fuel still available in the motor vehicle. Subsequently, the program will be terminated in Step S20.

If the condition of Step S12 has been met, in Step S26, the third mean fuel consumption FC_MEAN is determined from a sum of the product of the second mean fuel consumption FC_MEAN_ACT times a weighting factor G_H plus the product of the first mean fuel consumption FC_MEAN_LONG times a difference of one minus the weighting factor G_H. This means that, at the beginning of the predefined time period TIME_H, the third mean fuel consumption FC_MEAN is equal to the first mean fuel consumption FC_MEAN_LONG. Between the beginning and the end of the predefined time period TIME_H, the third mean fuel consumption FC_MEAN is weighted by means of the weighting factor G_H of the first mean fuel consumption FC_MEAN_LONG and the second mean fuel consumption FC_MEAN_ACT. As of an end of the predetermined time TIME_H, the third mean fuel consumption FC_MEAN is equal to the second mean fuel consumption FC_MEAN_ACT. For the detailed determination of the weighting factor G_H, reference is made to the description of FIG. 3.

In a further Step S28, the third mean fuel consumption FC_MEAN is signaled to the user by way of the signaling unit 18. In a further Step S30, the elapsed time period TIME_ACT since the resetting of the second mean fuel consumption FC_MEAN_ACT is newly determined. Subsequently, the program will be terminated in the further Step S20.

Figure 3:
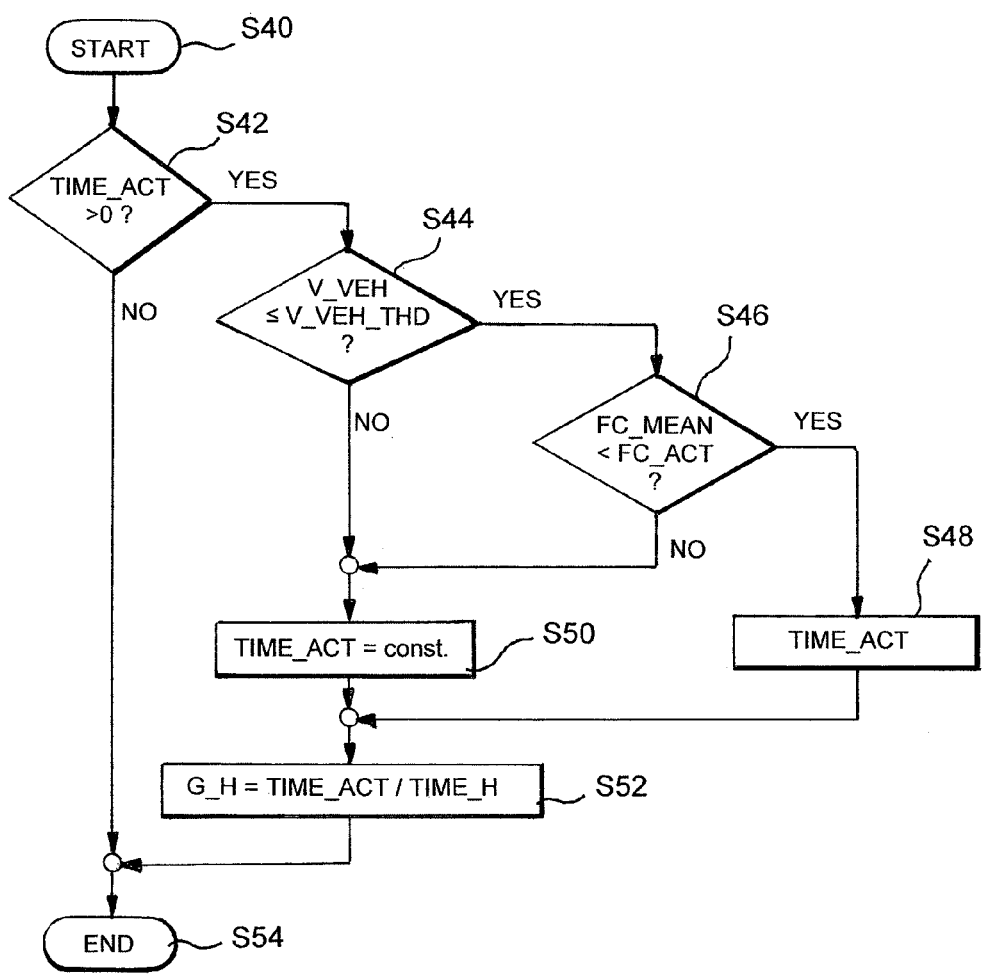
FIG. 3 is a flow chart of an additional program for determining the fuel consumption of the motor vehicle.

A program schematically illustrated in FIG. 3 shows the determination of the weighting factor G_H. The program is preferably started in a Step S40. This preferably takes place in parallel with the sequence of the program illustrated in FIG. 2 or between two sequences of the program illustrated in FIG. 2.

In a further Step S42, it is checked whether the elapsed time period TIME_ACT since the resetting of the second mean fuel consumption FC_MEAN_ACT is longer than 0. If this is not so, the program will end in a further Step S54.

If the condition of Step 42 has been met, it is checked in Step S44 whether a speed V_VEH of the motor vehicle is less than or equal to a threshold value V_VEH_THD of the speed of the motor vehicle. When this is the case, it is checked in a further Step S46 whether the third mean fuel consumption FC_MEAN is less than an actual fuel consumption VC_ACT. If this condition has been met, the elapsed time period TIME_ACT since the resetting of the second mean fuel consumption FC_MEAN_ACT is newly determined in a further Step S48.

In contrast, if the condition of Step S44 or the condition of Step S46 has not been met, the elapsed time period TIME_ACT is held constant at the previous value in a further Step S50. Such a pausing of the elapsed time period TIME_ACT since the resetting of the second mean fuel consumption FC_MEAN_ACT makes it possible that the elapsed time period TIME_ACT remains unchanged between a stopping and a restarting of the vehicle and can then continue to run again. Furthermore, when the third mean fuel consumption FC_MEAN falls below the actual fuel consumption FC_ACT, the elapsed time period TIME_ACT can remain unchanged. This can avoid an incorrect calculation of the third mean fuel consumption FC_MEAN. In both cases, the predefined time period TIME_H can be utilized as much as possible for the adaptation of the signaling of the third mean fuel consumption FC_MEAN.

After the determination of the elapsed time period TIME_ACT in Steps S48 and S50, in a further Step S52, the weighting factor G_H is determined as a ratio of the elapsed time period TIME_ACT since the resetting of the second mean fuel consumption FC_MEAN_ACT to the predefined time period TIME_H. This means, in other words, that the time sequence of the weighting factor G_H during the predefined time period TIME_H has a linear course, in which case, at the beginning of the predefined time period TIME_H, the weighting factor G_H has the value of zero and, starting at an end of the predefined time period TIME_H, the weighting factor G_H assumes the value of one. This indicates a particularly simple possibility of the development of the time sequence of the weighting factor G_H. With respect to the calculation of the third mean fuel consumption FC_MEAN in Step S26 (FIG. 2), this means that, at the beginning of the predefined time period TIME_H, the third average mean fuel consumption FC_MEAN is equal to the first mean fuel consumption FC_MEAN_LONG; between the beginning and the end of the present time period TIME_H, a linear increase of the weighting fraction of the second mean fuel consumption FC_MEAN_ACT, and a linear decrease of the weight of the first mean fuel consumption FC_MEAN_LONG takes place; and starting at an end of the predefined time period TIME_H, the third mean fuel consumption FC_MEAN is equal to the second mean fuel consumption FC_MEAN_ACT. As an alternative to what was indicated in Step 52, the weighting factor G_H may also have a non-linear time sequence.

In a further Step S54, the program for determining the weighting factor G_H will be terminated.

Even after a resetting of the second mean fuel consumption FC_MEAN_ACT by the user, it becomes possible in a particularly simple manner to determine the third mean fuel consumption FC_MEAN and to signal it fairly realistically by means of the signaling unit 18, in which case the fluctuations of the signaled values can be minimized. While the determined third mean fuel consumption FC_MEAN is determined at the beginning of the predefined time period TIME_H by the first mean fuel consumption FC_MEAN_LONG, it approaches the second mean fuel consumption FC_MEAN_ACT more and more during the course of the predefined time period TIME_H. The predefined time period TIME_H for the harmonization preferably amounts to approximately 15 minutes. During this time period, the mean fuel consumption, which is otherwise quite variable due to severely fluctuating injection quantities, can be harmonized, and the third mean fuel consumption FC_MEAN can be very comfortably signaled to the user.

| Table of Reference Numerals | |
|---|---|
| 10 | Fuel consumption determining device |
| 12 | Device for determining and storing mean fuel consumptions |
| 14 | Sensors |
| 16 | Memory |
| 18 | Signaling unit |
| FC_MEAN_LONG | First mean fuel consumption |
| FC_MEAN_ACT | Second mean fuel consumption |
| FC_MEAN | Third mean fuel consumption |
| FC_ACT | Actual fuel consumption |
| G_H | Weighting factor |
| TIME_ACT | Elapsed time period after resetting |
| TIME_H | Predefined time period |
| V_VEH | Speed of the motor vehicle |
| V_VEH_THD | Threshold value of speed |
| RESET | Resetting |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for determining fuel consumption of a motor vehicle, the process comprising the acts of:
   determining a first mean fuel consumption, which cannot be reset under a user's influence;
   determining a second mean fuel consumption, which is resettable under a user's influence, as a function of several measured values; and
   determining a third mean fuel consumption; wherein:
   (a) at a beginning of a predefined time period, which starts with a resetting of the second mean fuel consumption influenced by a user, the third mean fuel consumption is set to be equal to the first mean fuel consumption;
   (b) between the beginning and the end of the predefined time period, the third mean fuel consumption is set to be a weighted mean of the first mean fuel consumption and the second mean fuel consumption; and
   (c) starting at an end of the predefined time period, the third mean fuel consumption is set to be equal to the second mean fuel consumption; and
   providing a signal indicative of the third mean fuel consumption.

2. The process according to claim 1, wherein the determining of the third mean fuel consumption comprises the act of:
   determining the third mean fuel consumption as a sum of the product of the second mean fuel consumption and a weighting factor plus the product of the first mean fuel consumption and a difference of one minus the weighting factor;
   wherein:
   at a beginning of the predefined time period, the weighting factor is set to a zero value,
   within the predefined time period, the weighting factor is determined in a linearly increasing manner as a function of an elapsed time period since the resetting of the second mean fuel consumption, and
   as of the end of the predefined time period, the weighting factor is set to a value of one.

3. The process according to claim 2, further comprising the act of:
   checking whether the motor vehicle is stopped and, when the motor vehicle is determined to be stopped, maintaining the elapsed time period since the resetting of the second mean fuel consumption constant.

4. The process according to claim 3, wherein the motor vehicle is determined to be stopped when a speed of the motor vehicle falls below a predefined speed threshold value.

5. The process according to claim 4, wherein the predefined speed threshold value is approximately equal to 15 km/h.

6. The process according to claim 2, further comprising the acts of:
   determining an actual fuel consumption as a function of several measured values;
   checking whether the actual fuel consumption is greater than the third mean fuel consumption; and
   when the actual fuel consumption is greater than the third mean fuel consumption, maintaining the elapsed time period since the resetting of the second means fuel consumption is constant.

7. The process according to claim 3, further comprising the acts of:
   determining an actual fuel consumption as a function of several measured values;
   checking whether the actual fuel consumption is greater than the third mean fuel consumption; and
   when the actual fuel consumption is greater than the third mean fuel consumption, maintaining the elapsed time period since the resetting of the second means fuel consumption is constant.

8. The process according to claim 4, further comprising the acts of:
   determining an actual fuel consumption as a function of several measured values;
   checking whether the actual fuel consumption is greater than the third mean fuel consumption; and
   when the actual fuel consumption is greater than the third mean fuel consumption, maintaining the elapsed time period since the resetting of the second means fuel consumption is constant.

9. The process according to claim 5, further comprising the acts of:
   determining an actual fuel consumption as a function of several measured values;
   checking whether the actual fuel consumption is greater than the third mean fuel consumption; and
   when the actual fuel consumption is greater than the third mean fuel consumption, maintaining the elapsed time period since the resetting of the second means fuel consumption is constant.

10. A device for determining fuel consumption of a motor vehicle, comprising:
   a first mean fuel consumption determining unit, which cannot be reset under a user's influence;
   a second mean fuel consumption determining unit, which is resettable under a user's influence, as a function of several measured values;
   a third mean fuel consumption determining unit, said third unit being operatively configured to:
      (a) at a beginning of a predefined time period, which starts with a resetting of the second mean fuel consumption, set the third mean fuel consumption to be equal to the first mean fuel consumption;
      (b) between the beginning and the end of the predefined time period, which starts with a resetting of the second of the second mean fuel consumption influenced by the user, set the third mean fuel consumption to be a weighted mean of the first mean fuel consumption and the second mean fuel consumption; and
      (c) starting at an end of the predefined time period, set the third mean fuel consumption to be equal to the second mean fuel consumption; and
   a signal indicative of the third mean fuel consumption.

11. A system for a motor vehicle, comprising:
   a device for determining fuel consumption of the motor vehicle, the device comprising:
      a first mean fuel consumption determining unit, which cannot be reset under a user's influence;
      a second mean fuel consumption determining unit, which is resettable under a user's influence, as a function of several measured values;
      a third mean fuel consumption determining unit, said third unit being operatively configured to:
         (a) at a beginning of a predefined time period, which starts with a resetting of the second mean fuel consumption, set the third mean fuel consumption to be equal to the first mean fuel consumption;
         (b) between the beginning and the end of the predefined time period, which starts with a resetting of the second of the second mean fuel consumption influenced by the user, set the third mean fuel consumption to be a weighted mean of the first mean fuel consumption and the second mean fuel consumption; and
         (c) starting at an end of the predefined time period, set the third mean fuel consumption to be equal to the second mean fuel consumption; and
   a signaling unit operatively coupled with the device for determining fuel consumption, the signaling unit receiving a signal indicative of the third mean fuel consumption from the device for determining fuel consumption and outputting a signal for a user of the motor vehicle.

\* \* \* \* \*